(12) United States Patent
Konyukhov et al.

(10) Patent No.: US 8,596,141 B2
(45) Date of Patent: Dec. 3, 2013

(54) VORTEX FLOW METER WITH VORTEX OSCILLATION SENSOR PLATE

(75) Inventors: Alexander Konyukhov, Chelyabinsk (RU); Vladimir Bogdanov, Chelyabinsk (RU)

(73) Assignee: Rosemount Inc., Eden Prairie, MN (US)

( * ) Notice: Subject to any disclaimer, the term of this patent is extended or adjusted under 35 U.S.C. 154(b) by 423 days.

(21) Appl. No.: 12/962,029

(22) Filed: Dec. 7, 2010

(65) Prior Publication Data

US 2011/0154913 A1 Jun. 30, 2011

(30) Foreign Application Priority Data

Dec. 24, 2009 (WO) ................ PCT/RU2009/000722

(51) Int. Cl.
*G01F 1/32* (2006.01)
(52) U.S. Cl.
USPC ....................................... 73/861.24
(58) Field of Classification Search
None
See application file for complete search history.

(56) References Cited

U.S. PATENT DOCUMENTS

| | | | |
|---|---|---|---|
| 1,935,445 A | 11/1933 | Heinz | 73/861.24 |
| 3,946,608 A | 3/1976 | Herzl | 73/194 |
| 4,033,189 A | 7/1977 | Herzl et al. | 73/194 |
| 4,083,240 A | 4/1978 | Herzl | 73/861.24 |
| 4,169,376 A | 10/1979 | Herzl | 73/194 |
| 4,201,084 A | 5/1980 | Ito et al. | 73/194 |
| 4,248,098 A | 2/1981 | Sawayama et al. | 73/861.24 |
| 4,339,957 A | 7/1982 | Herzl | 73/861.24 |
| 4,464,939 A | 8/1984 | Corpron | 73/861.24 |
| 4,475,405 A | 10/1984 | Corpron et al. | 73/861.24 |
| 4,520,678 A | 6/1985 | Koziol et al. | 73/861.24 |
| 4,625,564 A | 12/1986 | Murakami et al. | 73/861.24 |
| 4,679,445 A | 7/1987 | Knudsen et al. | 73/861.24 |
| 4,699,012 A | 10/1987 | Lew et al. | 73/861.24 |
| 4,703,659 A | 11/1987 | Lew et al. | 73/861.24 |
| 4,718,283 A | 1/1988 | Kamentser | 73/861.24 |
| 4,791,818 A | 12/1988 | Wilde | 73/861.24 |
| 4,884,441 A | 12/1989 | Lew | 73/195 |
| 4,884,458 A | 12/1989 | Lew | 73/861.24 |
| 4,891,990 A | 1/1990 | Khalifa et al. | 73/861.24 |
| 4,911,019 A | 3/1990 | Lew | 73/861.24 |

(Continued)

FOREIGN PATENT DOCUMENTS

GB 823684 11/1959

OTHER PUBLICATIONS

Second Russian Office Action for corresponding Russian Application No. 2010152347, dated Feb. 27, 2012, 5 pages.

(Continued)

*Primary Examiner* — Harshad R Patel
(74) *Attorney, Agent, or Firm* — Westman, Champlin & Koehler (57) ABSTRACT

A vortex flow meter includes a vortex responsive assembly having a diaphragm. The diaphragm seals a base end of the assembly to form an isolation chamber. The assembly is adapted to seal an opening in a sidewall of a flow passage. Support struts preferably protrude from the assembly into the flow passage. In one configuration, a vortex oscillation sensor plate has a proximate edge supported on the diaphragm and an opposite distal edge that is unsupported. The vortex oscillation sensor plate has upstream and downstream edges preferably supported by the support struts. A pivoting strut extends along a central region of the vortex oscillation sensor plate. The pivoting strut extends through the diaphragm. The pivoting strut transfers vortex oscillations to a sensor. An electronic transmitter circuit receives a sensor output and provides an output related to flow of the fluid.

19 Claims, 7 Drawing Sheets

(56) References Cited

U.S. PATENT DOCUMENTS

| | | | |
|---|---|---|---|
| 4,926,532 A | 5/1990 | Phipps | 73/861.24 |
| 4,926,695 A | 5/1990 | Kleven et al. | 73/861.24 |
| 4,972,723 A | 11/1990 | Lew | 73/861.24 |
| 4,973,062 A | 11/1990 | Lew | 73/861.24 |
| 4,984,471 A | 1/1991 | Storer | 73/861.24 |
| 5,036,240 A | 7/1991 | Lew | 310/338 |
| 5,076,105 A | 12/1991 | Lew | 73/861.24 |
| 5,095,760 A | 3/1992 | Lew | 73/861.24 |
| 5,109,704 A | 5/1992 | Lew | 73/861.24 |
| 5,197,336 A | 3/1993 | Tsuruoka et al. | 73/861.24 |
| 5,343,762 A | 9/1994 | Beulke | 73/861.24 |
| 5,396,810 A | 3/1995 | Beulke | 73/861.24 |
| 5,869,772 A | 2/1999 | Storer | 73/861.24 |
| 6,003,384 A * | 12/1999 | Frohlich et al. | 73/861.22 |
| 6,053,053 A | 4/2000 | Huotari | 73/861.22 |
| 6,237,425 B1 | 5/2001 | Watanobe | 73/861.22 |
| 6,352,000 B1 * | 3/2002 | Getman et al. | 73/861.22 |
| 6,973,841 B2 | 12/2005 | Foster | 73/861.22 |
| 6,988,418 B2 | 1/2006 | Koudal et al. | 73/861.22 |
| 2003/0061887 A1 * | 4/2003 | Koudal et al. | 73/861.22 |
| 2004/0216532 A1 | 11/2004 | Koudal et al. | 73/861.22 |
| 2005/0145041 A1 * | 7/2005 | Koudal et al. | 73/861.22 |
| 2005/0210998 A1 | 9/2005 | Dimarco et al. | 73/861.22 |
| 2009/0217771 A1 | 9/2009 | Hoecker | 73/861.22 |

OTHER PUBLICATIONS

Russian Office Action (with English translation) for corresponding Russian Patent Application No. 2010152347/28 (075704), dated Dec. 26, 2011, 11 pages.

Japanese Office Action from Application No. 2011-547849, dated May 21, 2013.

* cited by examiner

VORTEX FLOW METER WITH VORTEX OSCILLATION SENSOR PLATE

The present application claims priority of PCT patent application Serial No. PCT/RU2009/000722, filed Dec. 24, 2009, the content of which is hereby incorporated by reference in its entirety.

BACKGROUND

This invention relates to flow meters, and in particular to flow meters which operate on the principle of measuring the frequency or period of vortices in a Karman vortex street set up in a moving fluid.

Flow meters are used in industrial processes to measure flow of process fluid. One type of flow meter, known as a vortex flow meter, measures flow by sensing vortexes in the flow. These vortexes can be sensed by using a vortex oscillation plate. The accuracy of the measurements is affected by the ability of the oscillation late to respond to the vortexes. A thin plate can provide more accurate measurements, however, it is also more prone to failure than a thicker plate.

SUMMARY

A vortex flow meter includes a vortex responsive assembly having a diaphragm. The diaphragm seals a base end of the assembly to form an isolation chamber. The assembly is adapted to seal an opening in a sidewall of a flow passage. Support struts preferably protrude from the assembly into the flow passage. In one configuration, a vortex oscillation sensor plate has a proximate edge supported on the diaphragm and an opposite distal edge that is unsupported. The vortex oscillation sensor plate has upstream and downstream edges preferably supported by the support struts. A pivoting strut extends along a central region of the vortex oscillation sensor plate. The pivoting strut extends through the diaphragm. The pivoting strut transfers vortex oscillations to a sensor. An electronic transmitter circuit receives a sensor output and provides an output related to flow of the fluid.

DETAILED DESCRIPTION OF ILLUSTRATIVE EMBODIMENTS

In the embodiments described below, a vortex sensing apparatus that senses vortices is positioned downstream of a vortex shedding bar in a vortex flow meter. The apparatus comprises a vortex oscillation sensor plate that senses vortices. The vortex oscillation sensor plate has upstream and downstream edges that are supported by upstream and downstream support struts. An upper proximate edge of the vortex oscillation sensor plate is supported on a diaphragm. A lower distal edge of the vortex oscillation sensor plate is unsupported and free to move in response to the vortices. A pivoting strut is attached to the vortex oscillation sensor plate and passes through the diaphragm into an isolation chamber behind the diaphragm. The pivoting strut extends into the isolation chamber and transfers vortex oscillations to a position in the isolation chamber. A sensor is coupled to the pivoting strut and senses the vortex oscillations. The sensor is connected to a transmitter circuit which provides an electrical output representative of the vortex oscillation frequency. The vortex oscillation frequency is representative of fluid flow velocity through the vortex flow meter.

Figure 1:
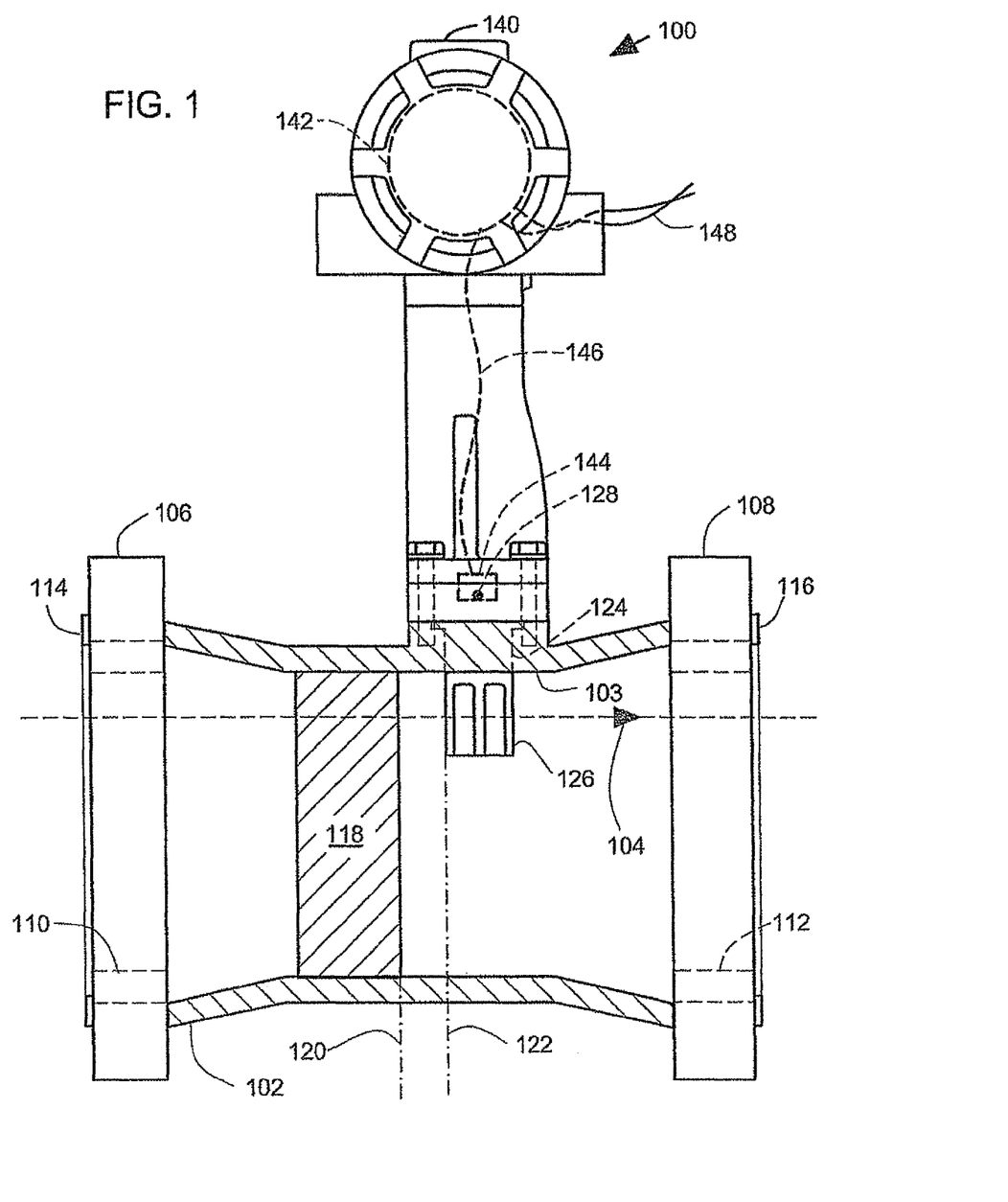
FIG. 1 illustrates a side sectional view of a vortex flow meter.

The use of the support struts allows the vortex oscillation sensor plate to be thin and to have a low mass. The use of the support struts increases the stiffness of the vortex oscillation sensor plate. The decreased mass and increased stiffness increase the natural resonant frequency of the sensing, resulting in a wider frequency range of sensing and improved signal to noise ratio. The support struts limit undesired flapping of the upstream and downstream edges of the vortex oscillation sensor plate FIG. 1 illustrates a side sectional view of a vortex flow meter 100. The vortex flow meter 100 comprises a flow tube 102 for carrying a fluid flow 104 of a fluid through the flow tube 102. The flow tube 102 comprises a round cylindrical sidewall 103. The fluid flow 104 can comprise a liquid or a gas. Pipe flanges 106, 108 are joined to the flow tube 102. The pipe flanges 106, 108 include bolt holes such as bolt holes 110, 112 for mounting to a fluid piping system with bolts (not illustrated). The pipe flanges 106, 108 include sealing faces 114, 116 for sealing to mating flanges of the fluid piping system.

The vortex flow meter 100 comprises a vortex shedder bar 118 inside the flow tube 102. The vortex shedder bar 118 comprises a bluff body shape. The vortex shedder bar 118 is attached to the flow tube 102 at an upstream position 120. As the fluid flow 104 flows past the shedder bar 118, vortices are generated in the fluid flow 104. The vortices are referred to as a von Karman vortex street. The vortices are present as the fluid flow 104 passes a downstream position 122. The downstream position 122 is positioned downstream of the upstream position 120.

The flow tube 102 includes an opening 124 in the sidewall 103. The vortex flow meter 100 comprises an apparatus 126 that passes through the opening 124. The apparatus 126 seals the opening 124 such that fluid in flow tube 102 does not leak out through the opening 124. The apparatus 126 extends into the fluid flow 104 and senses vortices at the downstream location 122. The apparatus 126 senses the vortices in the fluid flow 104 and transfers mechanical motion of the vortices to a position 128 that is outside the fluid flow 104. The apparatus 126 is not a part of the shedder bar 118. The apparatus 126 is spaced a distance downstream from the shedder bar 118. The apparatus 126 is described in more detail below in connection with FIGS. 3-7.

The vortex flow meter 100 comprises a transmitter 140. The transmitter 140 comprises an electronic transmitter circuit 142. The transmitter 140 comprises a mechanical sensor 144 that senses the mechanical motion at the position 128 and that provides an electrical sensor signal representative of the mechanical motion. The mechanical sensor 144 is connected by leads 146 to provide the electrical sensor signal to the electronic transmitter circuit 142. The electronic transmitter circuit 142 converts the electrical sensor signal to a standardized transmission signal provided to output leads 148. The electronic transmitter circuit 142 provides an output related to the fluid flow 104 through the flow tube 102, based upon sensed oscillations of the von Karman vortex street. The mechanical sensor 144 senses vortex oscillations at the sensing location 128 and provides a sensor output on leads 146. The electronic transmitter circuit 142 receives the sensor output from the mechanical sensor 144 and outputs the standardized transmission signal on output leads 148. According to one embodiment, the standardized transmission signal comprises a 4-20 milliampere, two wire transmitter output signal. According to another embodiment, the 4-20 mA signal provides all of the energization for the electronic transmitter circuit 142 and the mechanical sensor 144. According to other embodiments, the standardized transmission signal on output leads 148 comprises a CAN, HART, PROFIBUS or other known standard industrial communication signal. Lead 148 can comprise a two-wire process control loop in which the same two wires power the device and carry data. In one configuration, the communication loop is a wireless process control loop in which data is transmitted wirelessly, for example using radio frequency (RF) communication.

Figure 2:
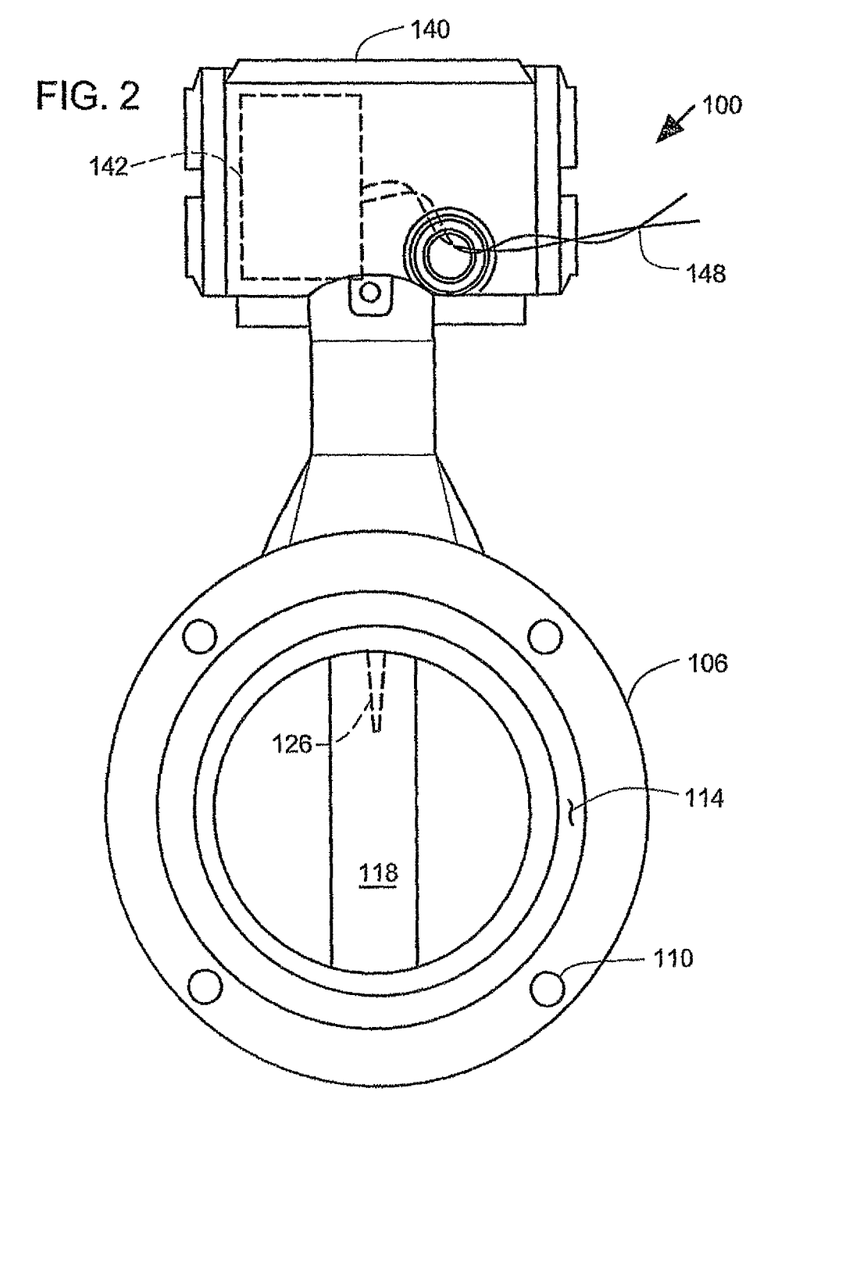
FIG. 2 illustrates an end view of the vortex flow meter of FIG. 1.

FIG. 2 illustrates an end view of the vortex flow meter 100 of FIG. 1. Reference numbers used in FIG. 2 are the same as reference numbers used in FIG. 1. As illustrated in to FIG. 2, a portion of the apparatus 126 inside the flow tube 102 is aligned in a downstream direction behind the shedder bar 118. As described in more detail below in connection with FIGS. 3-6, the apparatus 126 in FIGS. 1-2 comprises a vortex oscillation sensor plate, support struts and a pivoting strut that transfers mechanical motion to the mechanical sensor 144.

Figure 3:
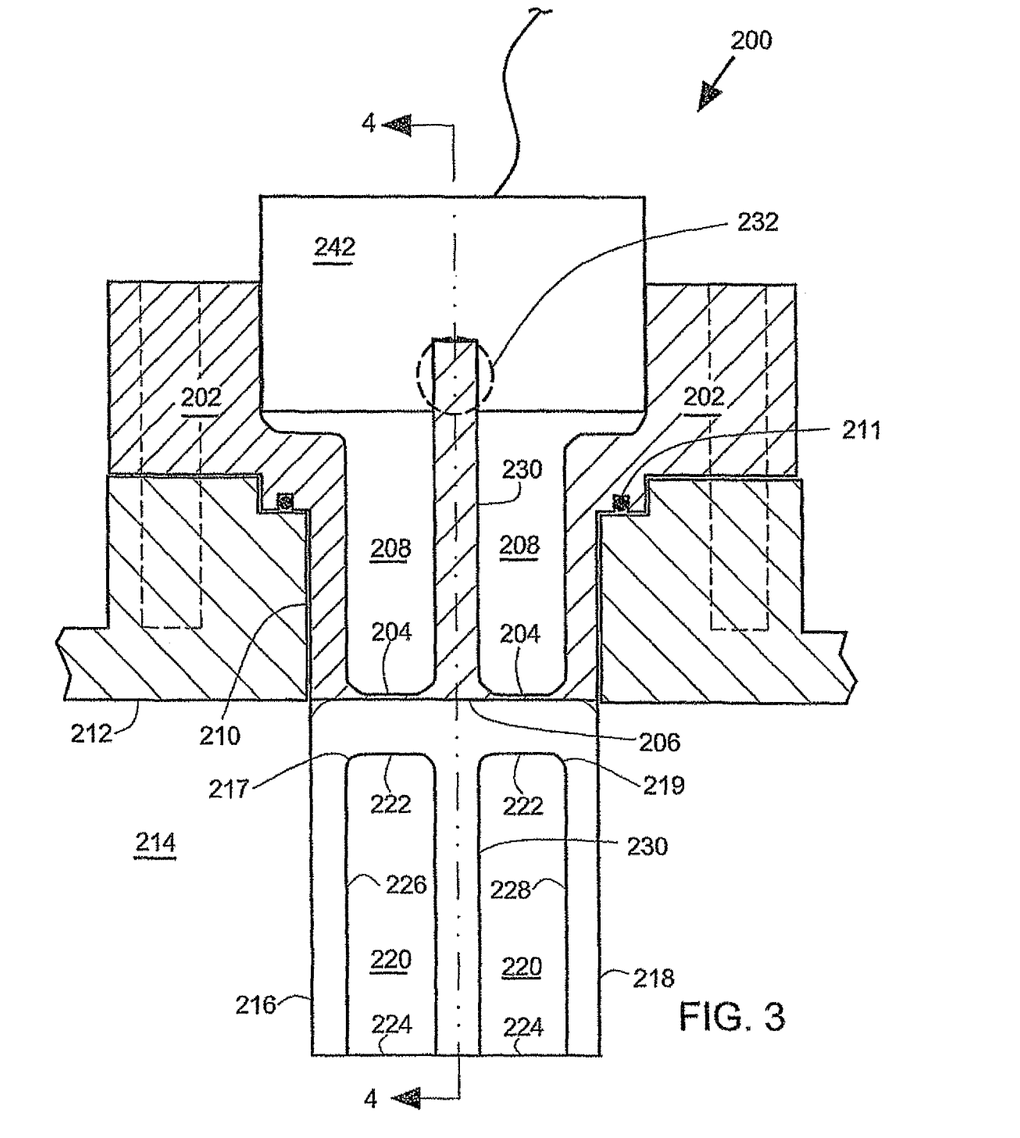
FIG. 3 illustrates a side sectional view of an apparatus that senses vortices.

FIG. 3 illustrates a side cross sectional view of an vortex responsive assembly 200 (corresponding with the apparatus 126 shown in FIGS. 1-2). The vortex responsive assembly 200 comprises an assembly 202. The assembly 202 includes a diaphragm 204 that seals a base end 206 of the assembly 202 to form an isolation chamber 208 in the assembly 202. The assembly 202 seals an opening 210 (corresponding with the opening 124 in FIG. 1) in a sidewall 212 (corresponding with the sidewall 103 in FIG. 1) of a flow passage 214. According to one embodiment, one or more O-rings 211 are compressed between the assembly 202 and the sidewall 212 to improve sealing. According to one aspect, the diaphragm 204 is configured to seal an opening 210 in a sidewall 212 to form an isolation chamber 208 at a downstream position 122.

The vortex responsive assembly 200 comprises an upstream support strut 216 and a downstream support strut 218. The support struts 216, 218 protrude from the assembly 202 into the flow passage 214. According to one embodiment, the support struts 216, 218 include corner gussets 217, 219 which provide additional support to the support struts 216, 218.

The assembly 200 comprises a vortex oscillation sensor plate 220 having a proximate edge 222 supported on the diaphragm 204. The vortex oscillation sensor plate 220 has a distal edge 224, opposite the proximate edge 222, that is unsupported. The vortex oscillation sensor plate 220 has an upstream edge 226 and a downstream edge 228 that are supported by the support struts 216, 218. According to one embodiment, the support struts 216, 218 limit flapping of the upstream and downstream edges 226, 228 due to vortices passing by the sensor plate 220.

The apparatus 200 comprises a pivoting strut 230. The pivoting strut 230 extends along a central region of the vortex oscillation sensor plate 220. The pivoting strut 230 extends through the diaphragm 204. The pivoting strut 230 transfer vortex oscillations to a sensing location 232 inside the isolation chamber 208. According to one aspect, the pivoting strut 230 is configured to transfer vortex oscillations 238 from the vortex oscillation sensor plate 220 to a sensor 242 at a sensing location 232 in the isolation chamber 208.

The pivoting strut 230 is coupled to a sensor 242 at the location 232. The sensor 242 can be of conventional design and can comprise a capacitive sensor, a magnetic sensor, an optical sensor, a piezoelectric sensor or other sensor used for sensing mechanical oscillation or mechanical oscillation frequency. The sensor 242 senses rotational oscillations of the pivoting strut 230. The sensor 242 is mounted to the assembly 202. According to one embodiment, the sensor 242 senses motion of the pivoting strut 230. According to another embodiment, the sensor 242 sensing forces exerted by the pivoting strut 230 on the sensor 242. According to yet another embodiment, the sensor 242 does not restrain the movement of the pivoting strut 230. According to yet another embodiment, the sensor 242 restrains the movement of the pivoting strut 230.

Figure 4:
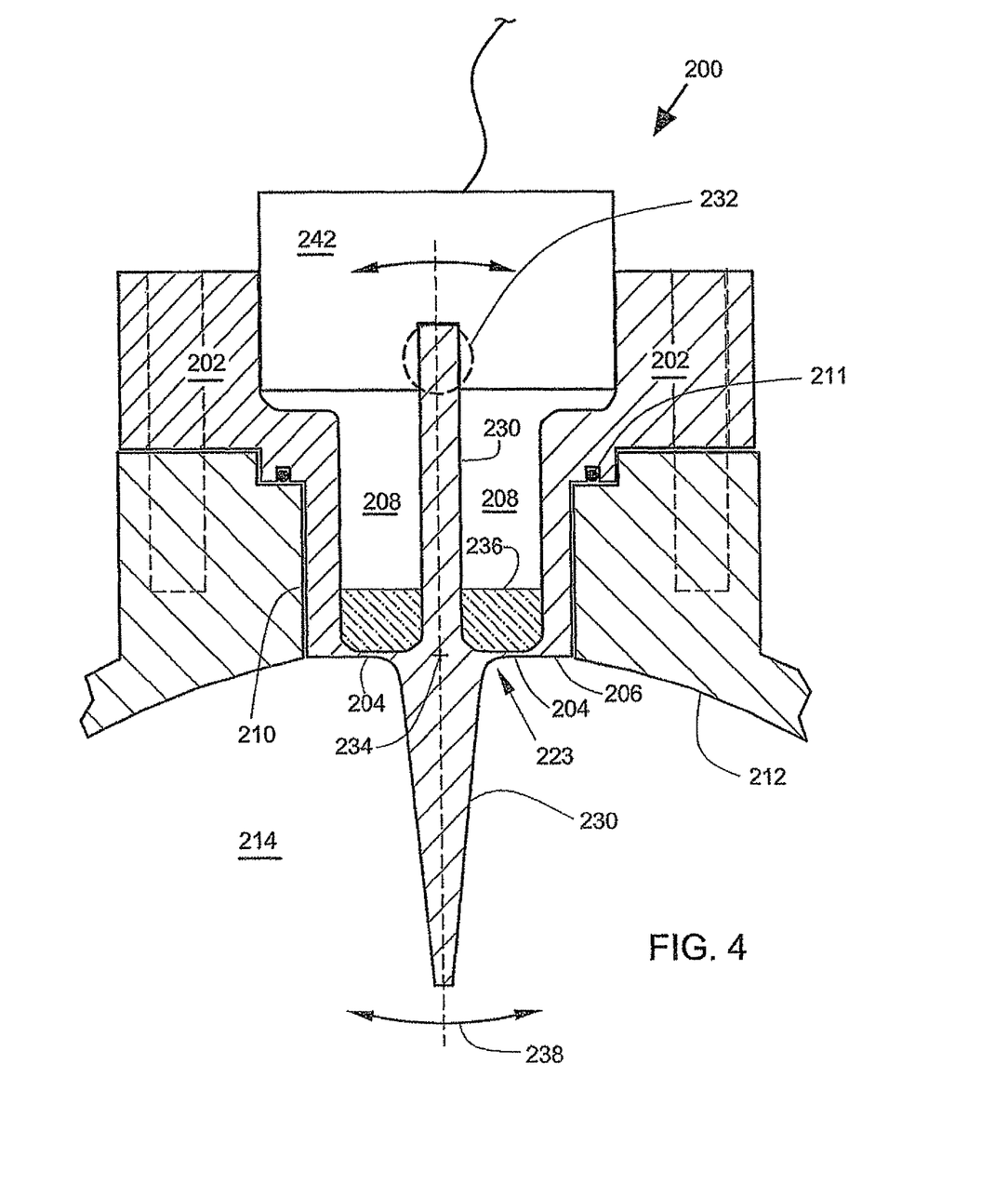
FIG. 4 illustrates a front cross sectional view along line 4-4 in FIG. 3.

FIG. 4 illustrates a front cross sectional view (along line 4-4 in FIG. 3) of the vortex responsive assembly 200 shown in FIG. 3. According to one embodiment, the pivoting strut 230 is inertially balanced around a rotational axis 234 adjacent the diaphragm 204. The inertial balancing has the advantage that the apparatus has reduced sensitivity to translational vibration noise.

According to another embodiment, an optional body 236 of viscous material is placed in contact with the pivoting strut 230 in the isolation chamber 208. The body 236 of viscous material damps rotational motion of the pivoting strut 230. According to another embodiment, an oscillation of a rotation motion 238 of the pivoting strut 230 has a damping ratio (zeta) of at least 0.4. Viscous damping has little effect on natural resonant frequency, but limits flapping. According to another embodiment, an oscillation of the rotation motion 238 of the pivoting strut 230 has a controlled natural resonant frequency of at least 20% higher than an upper frequency limit of vortex oscillations to be sensed. The upper frequency to be sensed generally corresponds with characteristics of the flowing fluid, particularly whether the flowing fluid is a gas or a liquid. The frequency of the vortex oscillations is a known function of the velocity of the flowing fluid. A relationship between vortex oscillation frequency and fluid velocity is determined empirically by calibration testing of the flow meter.

According to one embodiment, radii (such as radius 223) at edges of the diaphragm 204 have an effect on stiffness and can be sized to control stiffness of the diaphragm 204. According to another the radii (such as radius 223) also affect sensitivity and can be sized to control sensitivity.

Figure 5:
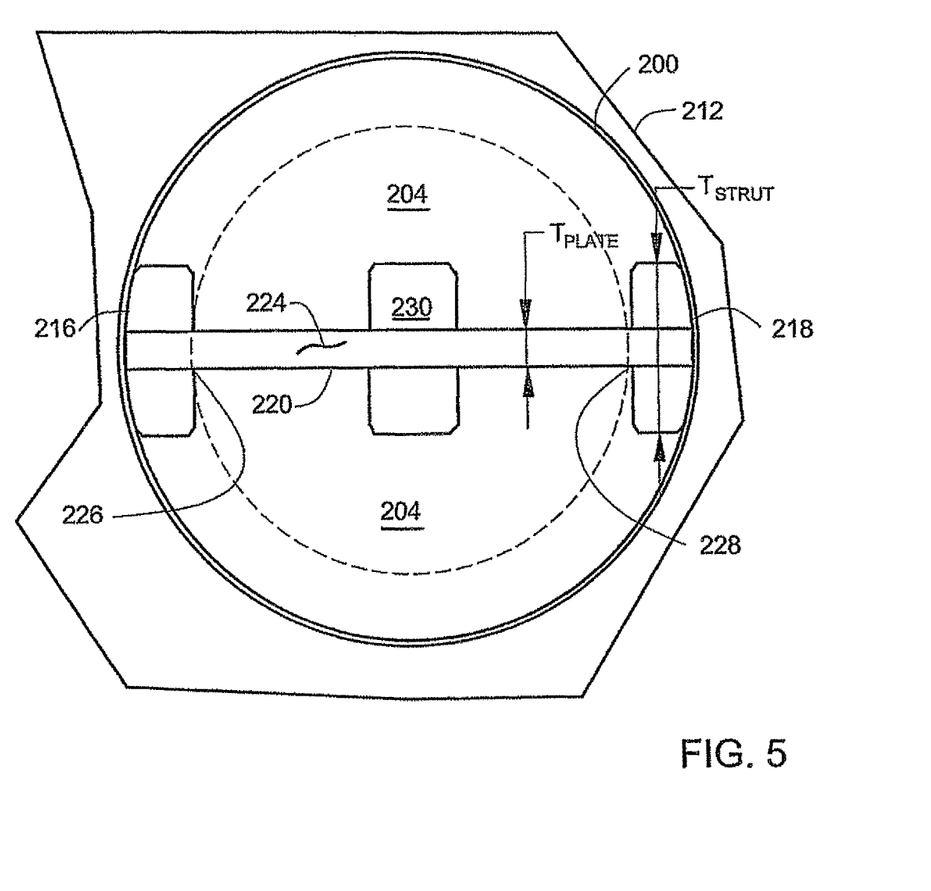
FIG. 5 illustrates a bottom view of the apparatus shown in FIGS. 3-4.

FIG. 5 illustrates a bottom view of the vortex responsive assembly 200 shown in FIGS. 3-4 as installed in the sidewall 212. FIG. 5 illustrates a thickness $T_{PLATE}$ of the vortex oscillation sensor plate 220. FIG. 5 illustrates a minimum thickness $T_{STRUT}$ of the support struts 216, 218 at a lower (distal) end of the vortex responsive assembly 200. According to one embodiment, the vortex oscillation sensor plate 220 has a controlled thickness $T_{PLATE}$ that is less than 30% of a controlled minimum thickness $T_{STRUT}$ of the support struts 216, 218.

The use of support struts 216, 218 allows the vortex oscillation sensor plate 220 to be thin, resulting in a low moving mass during oscillations. The support struts 216, 218 support the upstream and downstream edges 226, 228 of the vortex oscillation sensor plate 220 so that the vortex oscillation sensor plate 220 is stiff. The resulting system has an increased natural resonant frequency that is controlled due to the low moving mass and high stiffness. Natural resonant frequency depends on system mass and system stiffness. System mass is reduced by use of at thin vortex oscillation plate in grooves between the support struts 226, 228 and the lower (distal) end of the pivoting strut 230.

Figure 6:
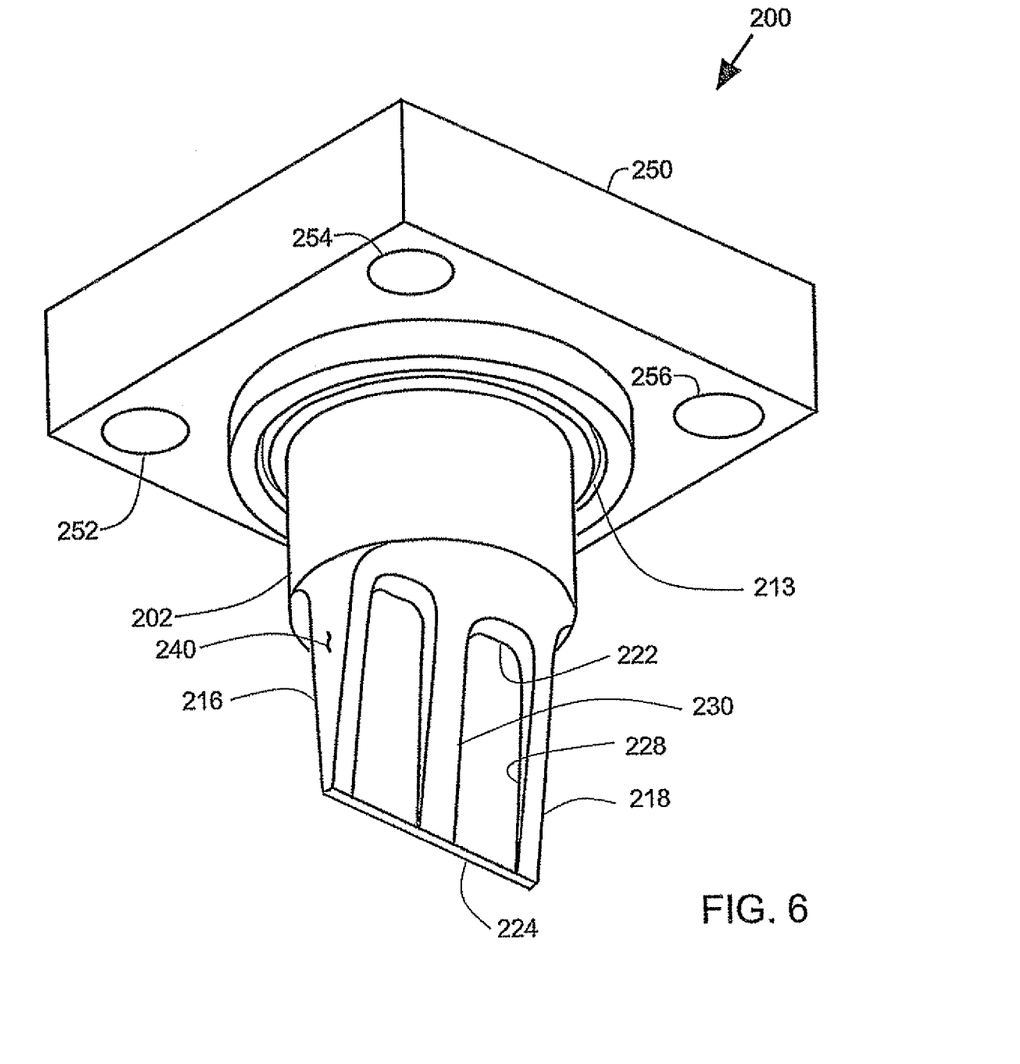
FIG. 6 illustrates an oblique view of the apparatus shown in FIGS. 3-5.

FIG. 6 illustrates an oblique view of the vortex responsive assembly 200 shown in FIG. 3. According to one embodiment, the support struts 216, 218 comprise a V-shaped cross-section 240. As best seen in FIG. 6, the vortex responsive assembly 200 includes an O-ring groove 213 that is shaped to receive the O ring 211. The vortex responsive assembly 200 comprises a rectangular mounting flange 250 that includes mounting holes such as holes 252, 254, 256 that are sized to receive bolts for mounting the vortex responsive assembly 200 to a flow tube. The vortex responsive assembly 200 is replaceable in a field working environment by removal of bolts.

Figure 7A:
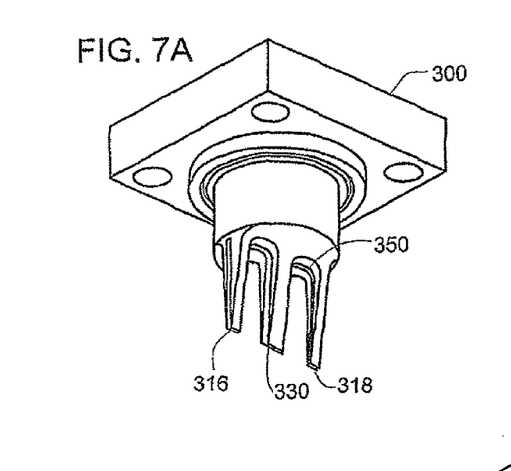
FIGS. 7A, 7B, 7C illustrate process steps in the manufacture of an apparatus.
Figure 7B:
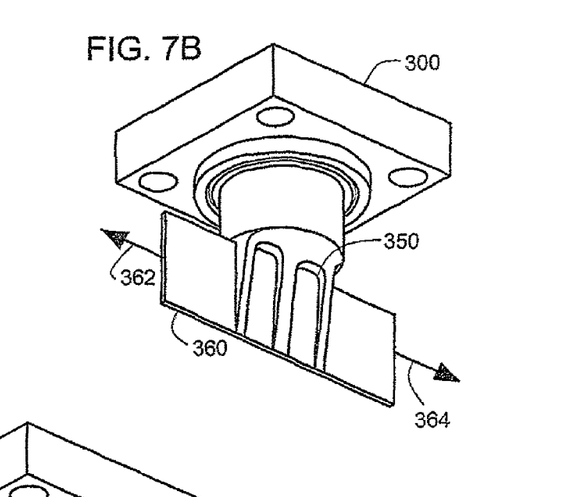
Figure 7C:
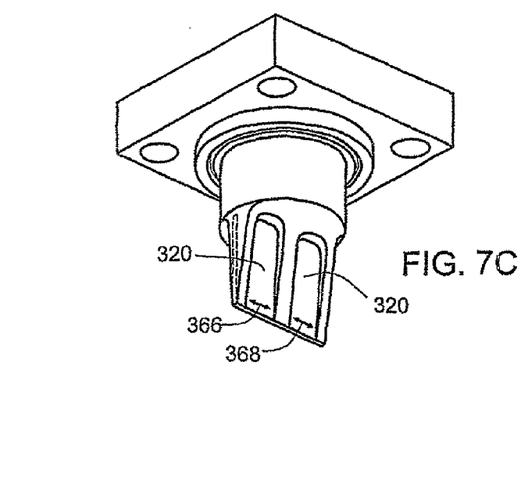

FIGS. 7A, 7B, 7C illustrate process steps in the manufacture of an apparatus 300 (corresponding with the apparatus 126 shown in FIGS. 1-2). In a first process step shown in FIG. 7A, the apparatus 300 is completely formed except for a vortex oscillation sensor plate 320. The vortex oscillation sensor plate 320 is missing at the step shown in FIG. 7A. The apparatus in FIG. 7A comprises a slot 350 that is cut into support struts 316, 318 and into a pivoting strut 330.

In a second process step shown in FIG. 7B, a metal plate 360 is inserted in the slot 350 as illustrated. The metal plate 360 is stretched by a stretching force so that the metal plate is in tension as illustrated by arrows 362, 364. While the metal plate 360 is stretched and in tension, the metal plate 360 is continuously welded or brazed to the support struts 316, 318 and the pivoting strut 330 on both sides. After the welding or brazing is complete, the stretching force is removed.

In a third step shown in FIG. 7B, waste portions of the metal plate 360 are trimmed away, leaving a central portion of the metal plate 360 as a vortex oscillation sensor plate 320. The vortex oscillation sensor plate 320 is under stored tensional stress 366, 368 in central rest position when it is undeflected by vortices. The stored tensional stress increases the stiffness of the vortex oscillation sensor plate 320.

Although the present disclosure is made with reference to preferred embodiments, workers skilled in the art will recognize that changes may be made in form and detail without departing from the spirit and scope of the invention. For example, the vortex flow meter can comprise a flangeless flow tube instead of a flanged flow tube. In another example, the sensor 242 can be constructed as an integral part of the assembly 202. In yet another example, the assembly 202 can be externally threaded and screw into an opening 210 that is threaded, eliminating a need for bolts.

What is claimed is:

1. A vortex flow meter, comprising:
    a pipe having a sidewall around a flow passage adapted to carry a fluid flow in a downstream direction;
    a vortex shedding bar mounted in the flow passage through an opening in the sidewall at an upstream position relative to the fluid flow and producing vortex oscillations in the fluid flow; and
    a vortex responsive assembly, comprising:
        a diaphragm sealing the opening in the sidewall to form an isolation chamber;
        a vortex oscillation sensor plate; and
        a pivoting strut that extends along a central region of the vortex oscillation sensor plate and that extends through the diaphragm to transfer vortex oscillations from the vortex oscillation sensor plate to a sensor; and
    an electronic transmitter circuit that receives a sensor output from the sensor and that provides an output related to flow of the fluid;
    wherein the vortex responsive assembly further comprising an upstream support strut and a downstream support strut, which is positioned downstream of the upstream support strut relative to the fluid flow, the upstream and downstream support struts protruding from the vortex responsive assembly, and by the vortex oscillation sensor plate having a proximate edge supported on the diaphragm, an opposite distal edge that is unsupported, an upstream edge supported by the upstream support strut and a downstream edge supported by the downstream support strut.

2. The vortex flow meter of claim 1 further comprising:
    viscous material in contact with the pivoting strut in the isolation chamber, the viscous material damping rotational motion of the pivoting strut.

3. The vortex flow meter of claim 1 further comprising support struts that limit flapping of the upstream and downstream edges of the vortex oscillation sensor plate.

4. The vortex flow meter of claim 3 wherein the vortex oscillation sensor plate has thickness that is less than 30% of a minimum thickness of the support struts.

5. The vortex flow meter of claim 4 wherein the support struts comprise a V-shaped cross-section.

6. The vortex flow meter of claim 1 wherein the pivoting strut is inertially balanced around a rotational axis adjacent the diaphragm.

7. The vortex flow meter of claim 1 wherein an oscillation of a rotation motion of the pivoting strut has a damping coefficient of at least 0.4.

8. The vortex flow meter of claim 1 wherein an oscillation of a rotation motion of the pivoting strut has a natural resonant frequency of at least 20% higher than an upper frequency limit of vortex oscillation.

9. A method of measuring a flow of a fluid through a flow passage having a pipe sidewall comprising:
    mounting a vortex shedding bar through an opening in the sidewall in the flow passage at an upstream position relative to the flow of the fluid;
    sealing the opening in the pipe sidewall with a diaphragm to form an isolation region;
    positioning a vortex oscillation sensor plate downstream of the vortex shedding bar relative to the flow of the fluid, wherein a proximate edge of the vortex oscillation sensor plate is supported on the diaphragm, the sensor plate includes an unsupported opposite distal edge, an upstream support strut supporting an upstream edge of the sensor plate relative to the flow of the fluid, and a downstream support strut supporting a downstream edge of the sensor plate relative to the flow of the fluid;
    oscillating the vortex oscillation sensor plate responsive to the flow of fluid past the vortex shedding bar;
    transferring the oscillations of the vortex oscillation sensor plate to a sensor through a pivoting strut that extends along a central region of the vortex oscillation sensor plate and through the diaphragm;
    sensing the oscillations transferred through the pivoting strut using a sensor; and
    providing an electronic transmitter circuit that receives a sensor output from the sensor measuring the flow of the fluid based upon the sensed oscillations.

10. The method of claim 9 further comprising:
    placing viscous material in contact with the pivoting strut in an isolation chamber.

11. The method of claim 9 including limiting flapping of the upstream and downstream edges of the vortex oscillation sensor plate using the upstream and downstream support struts.

12. The method of claim 11, wherein
a thickness of the vortex oscillation sensor plate is less than 30% of a minimum thickness of the support struts.

13. The method of claim 11 further comprising:
shaping the support struts to have a V-shaped cross-section.

14. The method of claim 9 further comprising:
axially balancing the pivoting strut around a rotational axis adjacent the diaphragm.

15. The method of claim 9 wherein a natural resonant frequency of an oscillation of a rotational motion of the pivoting strut is at least 20% higher than upper frequency limit of vortex oscillation.

16. The method of claim 9 further comprising:
providing a standardized transmission signal on a two wire process control loop.

17. The method of claim 9 further comprising:
providing a standardized transmission signal that comprises a wireless signal.

18. The method of claim 9 further comprising:
providing a standardized transmission signal that is selected from the group of CAN, HART and PROFIBUS industrial communication signals.

19. A vortex flow meter, comprising:
a pipe having a sidewall around a flow passage adapted to carry a fluid flow in a downstream direction;
a vortex shedding bar mounted in the flow passage through an opening in the sidewall at an upstream position relative to the fluid flow and producing vortex oscillations in the fluid flow;
diaphragm means for sealing an opening in the sidewall to form an isolation region;
a vortex oscillation sensor plate having a proximate edge supported on the diaphragm means, an opposite distal edge that is unsupported, and upstream and downstream edges that are supported;
pivoting strut means for transferring vortex oscillations from the vortex oscillation sensor plate to a sensor; and
an electronic transmitter circuit that receives a sensor output from the sensor and that outputs a standardized transmission signal.

* * * * *